United States Patent [19]
Hashimoto et al.

[11] Patent Number: 5,388,081
[45] Date of Patent: Feb. 7, 1995

[54] TWO-DIMENSIONAL NOISE SHAPING FILTER CIRCUIT

[75] Inventors: Yoshitaka Hashimoto, Tokyo; Atsushi Kikuchi, Kanagawa, both of Japan

[73] Assignee: Sony Corporation, Japan

[21] Appl. No.: 986,258

[22] Filed: Dec. 7, 1992

[30] Foreign Application Priority Data

Dec. 17, 1991 [JP] Japan .................................. 3-352872

[51] Int. Cl.$^6$ ................................................ H04N 5/21
[52] U.S. Cl. ................................. 348/606; 348/607; 348/625
[58] Field of Search ................... 358/166, 167, 37, 36, 358/463, 105, 135, 136; 341/76, 77; H04N 5/213, 5/14, 5/208

[56] References Cited

U.S. PATENT DOCUMENTS

| | | | |
|---|---|---|---|
| 4,953,026 | 8/1990 | Kobayashi et al. | 358/167 |
| 5,018,010 | 5/1991 | Masumoto | 358/136 |
| 5,124,703 | 6/1992 | Kaneaki et al. | 341/77 |
| 5,144,306 | 9/1992 | Masuda | 341/76 |

OTHER PUBLICATIONS

O Plus E, No. 60, pp. 90-98, inclusive (Nov. 1984) (Japanese document).

O Plus E, No. 61, pp. 95-100, inclusive (Dec. 1984) (Japanese document).

120/140 MBPS Intrafield DPCM System For Digital Transmission of HDTV Programs, 2nd Intl. Workshop on Signal Processing of HDTV, Feb. 29-Mar. 1988, L'Aquita, Italy.

*Primary Examiner*—Victor R. Kostak
*Assistant Examiner*—Nathan J. Flynn
*Attorney, Agent, or Firm*—Ronald P. Kananen

[57] ABSTRACT

A two-dimensional noise shaping filter circuit including a first adder for adding a feedback signal to the input signal A quantizer is provided for quantizing an output from the first adder. A second adder adds an output from the quantizer to the output from the first adder. A transfer function unit provides an output from the second adder with a two-dimensional transfer function so as to generate the feedback signal to be supplied to the first adder. Using the noise shaping filter circuit, it becomes possible to provide a video signal with a two-dimensional noise shaping process, not only for a present line but also for a preceding line and a succeeding line. White noises caused by the quantizing process can be moved towards corners of a square Brillouin zone. Noise levels can be decreased at desired locations, such as at a portion of the center of a screen having a lower spatial frequency.

6 Claims, 13 Drawing Sheets

| a00 | a10 | a20 | a30 | a40 | a50 | a60 |
| a01 | a11 | a21 | a31 | a41 | a51 | a61 |
| a02 | a12 | a22 | a32 | a42 | a52 | a62 |
| a03 | a13 | a23 | a33 | a43 | a53 | a63 |
| a04 | a14 | a24 | a34 | a44 | a54 | a64 |
| a05 | a15 | a25 | a35 | a45 | a55 | a65 |
| a06 | a16 | a26 | a36 | a46 | a56 | a66 |

MAX. 5

MIN. −5
START 0          STOP .5

FIG. 10

$$\begin{pmatrix} a_{00} & a_{10} & a_{20} \\ a_{01} & a_{11} & a_{21} \\ a_{02} & a_{12} & a_{22} \end{pmatrix} = \begin{pmatrix} 1.0 & -0.35140 & 0.15985 \\ -0.35140 & 0.12348 & -0.05617 \\ 0.15985 & -0.05617 & 0.02555 \end{pmatrix}$$

F I G. 19

TWO-DIMENSIONAL NOISE SHAPING FILTER CIRCUIT

BACKGROUND

1. Field of the Invention

The present invention relates to two-dimensional noise shaping filter circuit for performing noise shaping operations for a video signal.

2. Background of the Invention

Figure 19:
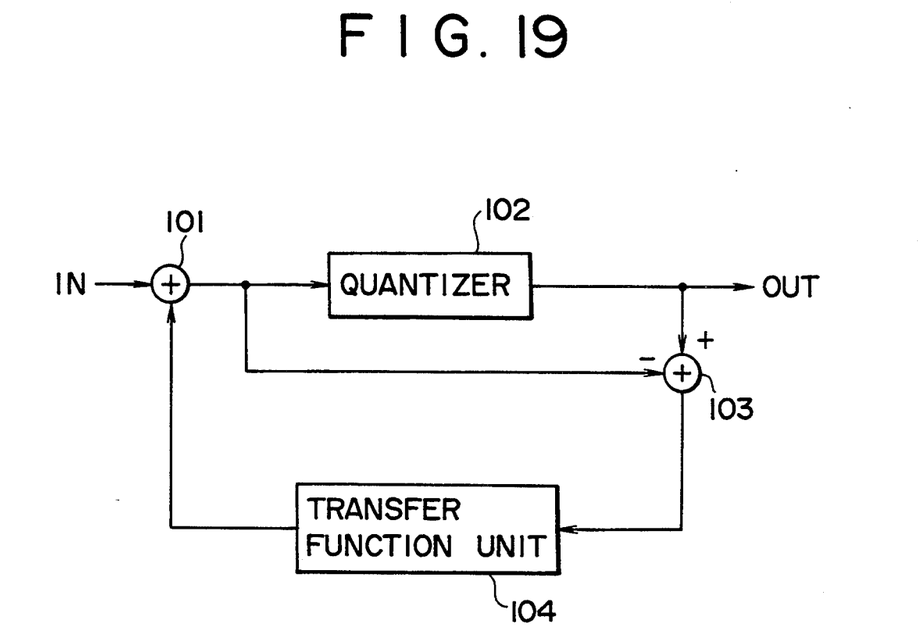
FIG. 19 is a block diagram of a conventional noise shaping filter circuit.

As an example of a noise shaping circuit, the circuit shown in FIG. 19 has been used for shaping noises in a signal to be processed. The noise shaping circuit shown in the drawing includes an adder 101, a quantizer 102, another adder 103 and a transfer function unit 104. The signal to be processed is received at the quantizer 102 and quantized there. Quantizing distortion caused by the quantizing process is fed back to the input stage through the transfer function unit 104. An output signal is obtained by the quantizing process while minimizing the quantizing distortion. The adder 101 adds the signal to be processed with the signal fed back from the transfer function unit 104. The adder 101 then sends the signal obtained by this process to both the quantizer 102 and another adder 103. The quantizer 102 receives the output of the adder 101 and quantizes it by a predetermined bit number. The output signal as obtained by this quantizing process is supplied to the another adder 103. The adder 103 subtracts the output signal of the adder 101 from the output of the quantizer 102 so as to generate a signal representative of the quantizing error during the quantizing process at the quantizer 102. This quantizing error signal is supplied to the transfer function unit 104. When receiving the quantizing error signal from the adder 103, the transfer function unit 104 works as a filter with a predetermined filtering characteristics. It sends the signal obtained by this filtering process back to the adder 101 as a feedback signal. Whenever a signal to be processed is supplied, this conventional noise shaping circuit receives the signal to be quantized and sends the quantizing distortion generated by the quantizing process back to input stage through the transfer function unit 104 as feedback. By minimizing the quantizing distortion, the noise shaping circuit generates an output having a characteristic as described below.

EQUATION #1

$$Y(Z) = X(Z) + E(Z)(1 + Z^{-1}H(Z))$$

Where:

- Y(Z): Z-Transform value of the output signal from the quantizer 102
- X(Z): Z-Transform value of the input signal to the adder 101
- E(Z): Z-Transform value of the quantizing error signal from the adder 103
- H(Z): Z-Transform value representing the characteristic of transfer function unit 104

As clearly expressed by Equation #1, the noise shaping filter circuit as shown in FIG. 19 has the following transfer function P(Z).

EQUATION #2

$$P(Z) = 1Z^{-1}H(Z)$$

Recently, strong interest has been expressed in utilizing noise shaping processes on a video signal. However, as seen in Equation #2, the conventional noise shaping circuit only performs a one-dimensional filtering process. In other words, even though the noise shaping circuit shown in FIG. 19 can be applied to a video signal, the noise shaping process would be performed only within a single line. Therefore, it is not presently possible to achieve a noise shaping process of a line together with its preceding and succeeding line.

SUMMARY OF THE INVENTION

It is, therefore, an object of the present invention to provide a two-dimensional noise shaping filter circuit which makes it possible to provide a two-dimensional noise shaping process, not only processing a present line, but also a preceding line and succeeding line.

It is another object of the present invention to provide a two-dimensional noise shaping filter circuit which can move white noise caused by the quantizing process towards the corners of a square Brillouin zone.

It is a further object of the present invention to provide a two-dimensional noise shaping filter circuit which can decrease the noise level at a portion, such as the center, of a screen having a lower spatial frequency.

In one aspect of the present invention, a two-dimensional noise shaping filter circuit for performing a two-dimensional noise shaping process to an input signal to be processed comprises a first adder for adding the input signal with a feedback signal. A quantizer is provided for quantizing an output from the first adder. A second adder functions to add an output from the quantizer with the output from the first adder. A transfer function unit provides an output from the second adder with a certain two-dimensional transfer function so as to generate the feedback signal to be supplied to the first adder.

In accordance with the present invention, it becomes possible to provide a video signal, including not only a present line but also a preceding line and a succeeding line, with a two-dimensional noise shaping process. The white noises caused by the quantizing process can be moved towards the corners of a square Brillouin zone. Noise level can be decreased at a portion, such as the center, of screen having a lower spatial frequency.

The foregoing and other objectives, features and advantages of the invention will be more readily understood upon consideration of the following detailed description of certain preferred embodiments of the invention, taken in conjunction with the accompanying drawings.

DESCRIPTION OF THE INVENTION

Figure 1:
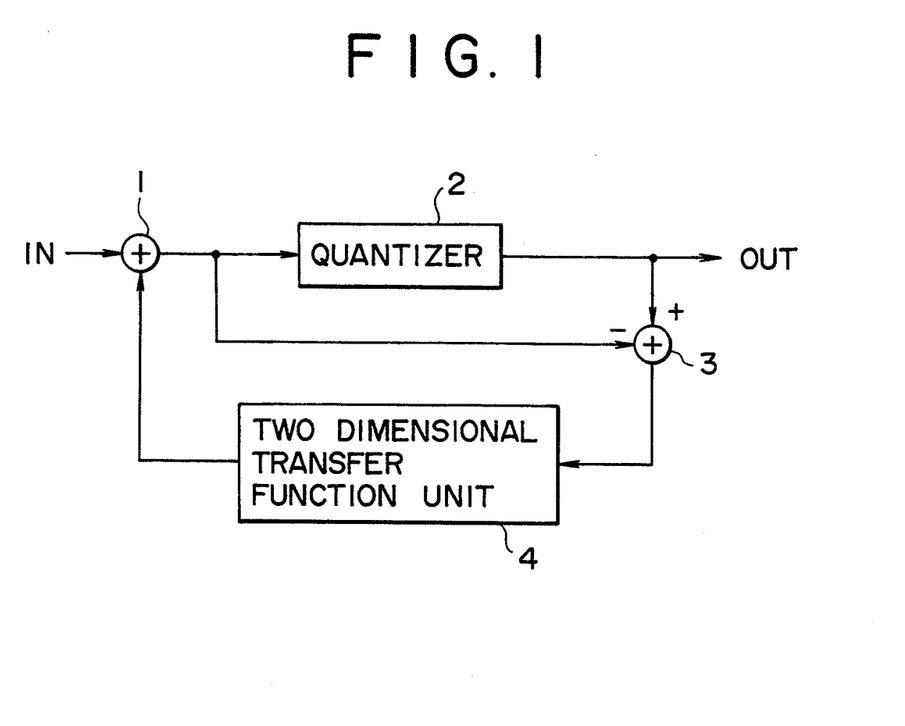
FIG. 1 is a block diagram of a two-dimensional noise shaping filter circuit as an embodiment of the present invention.

Referring first to FIG. 1, there is depicted an embodiment of the present invention, including a two-dimensional noise shaping circuit including an adder 1, a quantizer 2, another adder 3 and a two-dimensional transfer function unit 4 is depicted. The circuit functions to quantize a signal to be processed. Any quantizing distortion caused by this quantizing process is sent back to an input stage through the two-dimensional transfer function unit 4 so as to minimize the quantizing distortion and generate an output obtained by the quantizing process. The adder 1 adds the signal to be processed with the signal fed back from the two-dimensional transfer function unit 4. The adder 1 provides the quantizer 2 and the adder 3 with the signal obtained by this adding operation.

The quantizer 2 receives the output from adder 1 and quantizes it into a predetermined bit number. The quantizer 2 generates an output obtained by this quantizing operation and also supplies the output to the adder 3.

The adder 3 functions to subtract the output signal of the adder 1 from the output of the quantizer 2 so as to generate an error signal indicative of the quantizing error from the quantizing process at the quantizer 2.

The quantizing error signal is then supplied to the two-dimensional transfer function unit 4.

Figure 2:
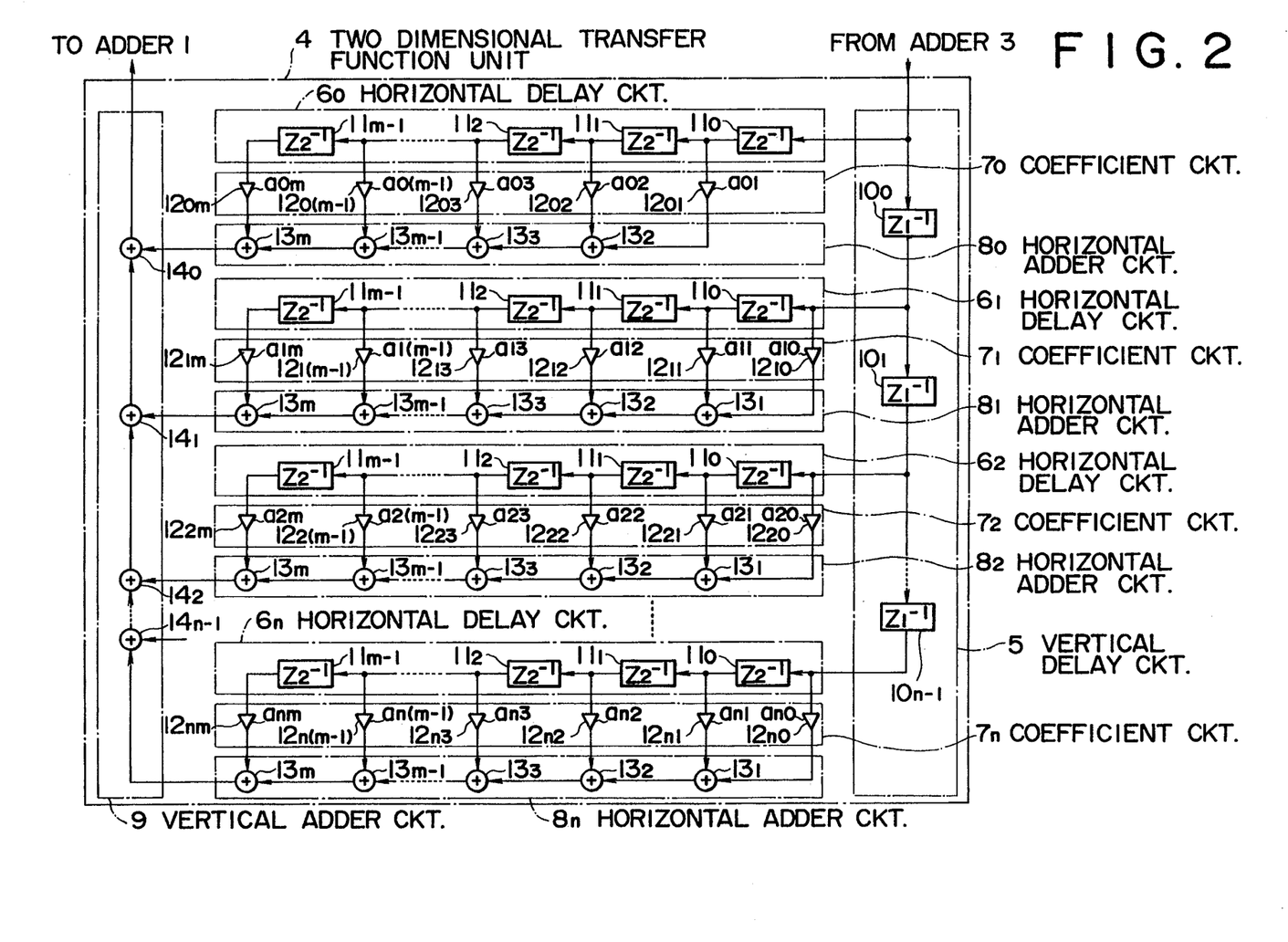
FIG. 2 is a detailed circuit block diagram of the transfer function unit of the circuit of FIG. 1.

As shown in FIG. 2, the two-dimensional transfer function unit 4 includes a vertical delay circuit 5, a plurality of horizontal delay circuits 60–6n, a plurality of coefficient circuits 70–7n, a plurality of horizontal adder circuits 80–8n and a vertical adder circuit 9. The transfer function unit 4 has a predetermined two-dimensional filtering characteristic and performs its filtering function against the quantizing error signal from the adder 3, and the output obtained by this filtering process is fed back to the adder 1 as a feedback signal.

The vertical delay circuit 5 is made of serially connected (n) pieces of single line delay elements 100–10n−1. It receives the quantizing error signal from the adder 3 and supplies this error signal to the first row of the horizontal delay circuit 60. The error signal from the adder 3 is then delayed in order by each of the single line delay elements 100–10n−1 of the vertical delay circuit 5. The delayed quantizing error signal obtained at output taps of each of the single line delay elements 100–10n−1 are then supplied to the horizontal delay circuits 61–6n at the second to the (n+1)th rows, respectively of the horizontal delay circuit.

Each of the horizontal delay circuits 61–6n are comprised of serially connected (m) pieces of single pixel delay elements 110–11m−1. Each of the horizontal delay circuits 61–6n receives a pixel signal from each tap line out of the vertical delay circuit 5. The pixel signal is then delayed by a unit of a single pixel in order by each of the single pixel delay elements 110–11m−1. Any quantizing error signal having no horizontal delay and any horizontally delayed quantizing error signal obtained at output taps of each of the single pixel delay elements 110–11m−1 are then supplied to the coefficient circuits 70–7n associated with the first to the (n+1)th rows of the horizontal delay circuit.

The coefficient circuit 70 associated with the first row of the horizontal delay circuit 60 includes (m) coefficient units 1201–12Om which multiply each of the horizontally delayed quantizing error signals from the horizontal delay circuit 60 by predetermined coefficients a01–a0m. After this multiplication process, the quantizing error signal is input to the horizontal adder circuit 80 associated with the coefficient circuit 70.

The horizontal adder circuit 80 includes (m−1) adder units 132–13m which add the quantizing error signals from each of the coefficient units 1201–120m in the first row coefficient circuit 70. By this adding operation, the adder circuit 80 generates a single output and supplies it to the vertical adder circuit 9.

The coefficient circuits 71–7n associated with the second to the (n+1)th rows respectively of the horizontal delay circuit each include (m+1) coefficient units 1210–121m, 12n0–12nm which multiply the horizontally delayed, quantizing error signals from each of the horizontal delay circuits 61–6n (i.e., the second to the (n+1)th rows of the horizontal delay unit) by predetermined coefficients a10–a1m, - - -, an0–anm. The quantizing error signals obtained by this multiplication process supplied to the horizontal adder circuits 81–8n.

The horizontal adder circuits 81–8n associated with the second to the (n1)th rows respectively of the coefficient circuits include (m) adder units 131–13m which add the quantizing error signal from each of the coefficient units 1210–121m, - - -, 12n0–12nm in the coefficient circuits 71–7n at the second and the (n+1)th rows. By this adding operation, each of the adder circuits 81-8n generates a single output and supplies it to the vertical adder circuit 9.

The vertical adder circuit 9 is made of serially connected (n) adder units 14o-14n. It adds each of the quantizing error signals derived from each of the horizontal adder circuits 80-8n and generates a feedback signal. The feedback signal is then supplied to the adder 1.

Assuming that the coefficients of each of the coefficient units 1201-120m, 1210-121m, - - - , 12n0-12nm of each of the coefficient circuits 70-7n in the transfer function unit 4 is aij (where i=0, 1, 2, - - - , and j=0, 1, 2, - - - , m, and a00=0); that the delayed amount of each of single line delay element 100-10n−1 in the vertical delay circuit 5 is $Z1^{-1}$; and that the delayed amount of each of the single pixel delay elements 110-11m−1 in each horizontal delay circuit is $Z2^{-1}$, then the transfer function H(Z1, Z2) of the transfer function unit 4 may be written as follows.

EQUATION #3

$$H(Z_1 \cdot Z_2) = a_{01}Z_2^{-1} + a_{02}Z_2^{-1} + \ldots + a_{0m}Z_2^{-m}$$
$$+ Z_1^{-1}(a_{10} + a_{11}Z_2^{-1} + a_{12}Z_2^{-2} + \ldots a_{1m}Z_2^{-m})$$
$$\vdots$$
$$+ Z_1^{-n}(a_{no} + a_{n1}Z^1 + a_{n2}Z_2^{-2} \ldots + a_{nm}Z_2^{-m})$$

Rewriting EQUATION #3, the following relationship may be obtained.

EQUATION #4

$$H(Z_1 \cdot Z_2) = \sum\sum_{}^{n\ \ m} a_{ij}Z_1^{-1} Z_2^{-j}$$

Where: $a_{\infty} = 0$

Where:
$a_{oo} = 0$

Thus, the relationship may be between the input and output signals of the noise shaping filter circuit 2 shown in FIG. 1 realized as follows.

EQUATION #5

$$Y(Z_1.Z_2) = X(Z_1.Z_2) + E(1 H(Z_1.Z_2))$$

Where:
$Y(Z_1.Z_2)$: Z-Transform value of output signal from the quantizer 2
$X(Z_1.Z_2)$: Z-Transform value of input signal to the adder 1
$E(Z_1.Z_2)$: Z-Transform value of quantizing error signal from the adder 3
$H(Z_1.Z_2)$: Z-Transform value representing characteristic of transfer function unit 4

The transfer function P(Z1, Z2) of this noise shaping filter circuit may be represented by the following equation.

EQUATION #6

$$P(Z_1.Z_2) = 1 + H(Z_1.Z_2)$$

As seen from Equations #4 and #6, the noise shaping filter circuit of FIG. 2 has a two-dimensional noise shaping characteristic.

Figure 3:
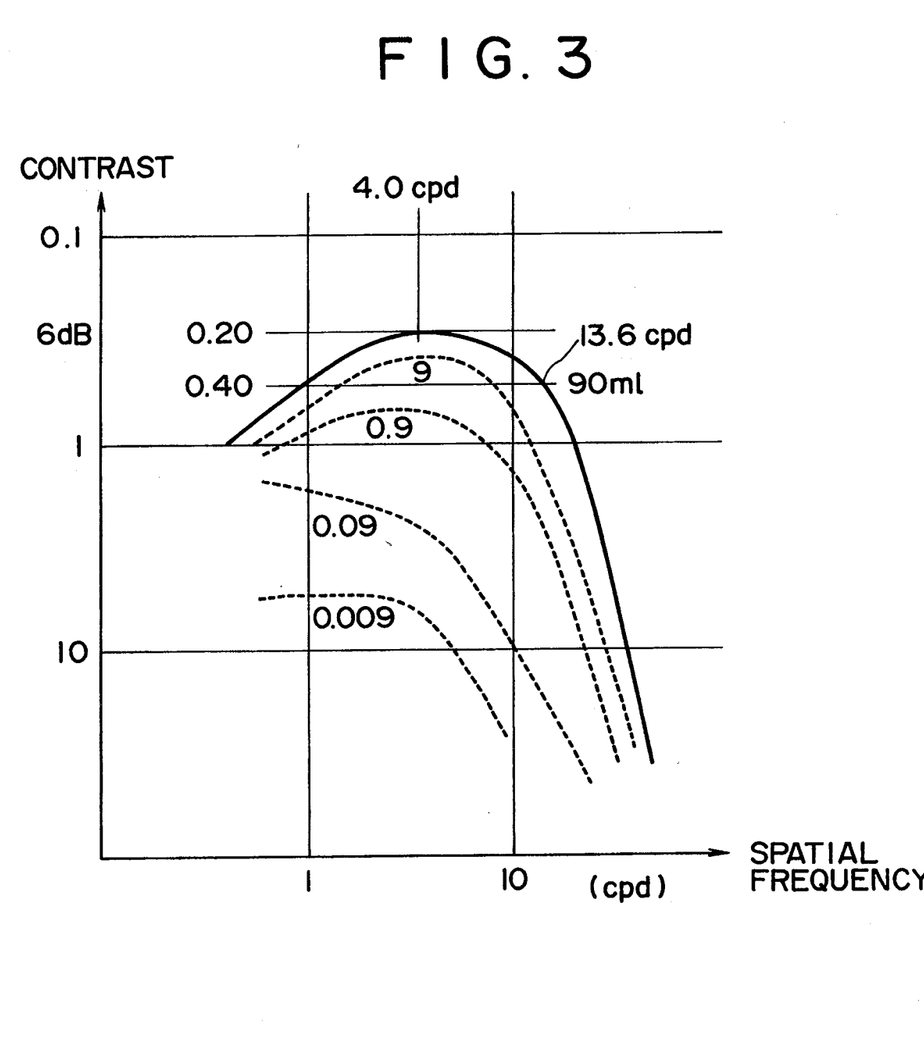
FIG. 3 is a drawing illustrating a simulated result between the sensibility of human eyes and the spatial frequency, which is well known to the public.

Referring next to FIG. 3, values for each coefficients will be explained as an example of use in the present noise shaping filter circuit. As a measured example representing the relationship between the sensitivity of human eyes and frequency, literature was introduced in "O plus E, November 1984, pp 90-98 and December 1984, pp 95-100". In this literature, variations in the transfer function are discussed and the drawing depicted in FIG. 3 is disclosed with the variation of averaged luminance as a parameter (0.009-90 Mil-Lambert).

Figure 4:
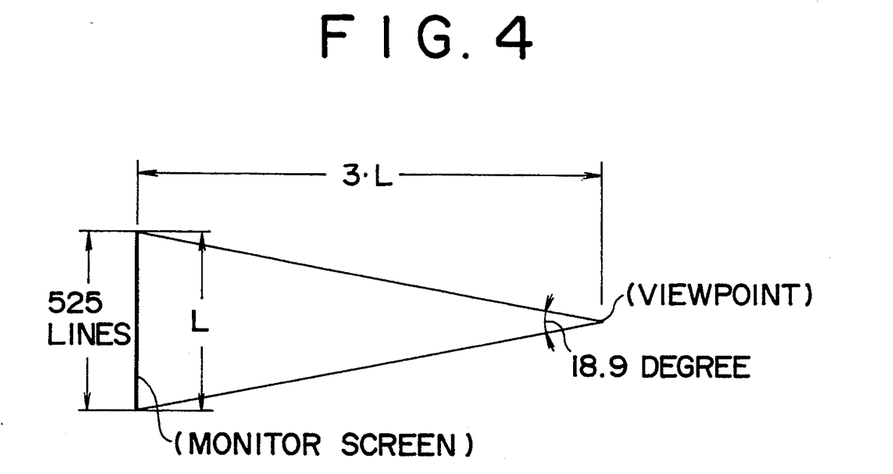
FIG. 4 is a drawing illustrating a condition used for calculating the coefficients at taps in the transfer function unit shown in FIG. 1.

As shown in FIG. 4, when viewing a monitor screen from a viewpoint at a distance which is three times longer than the height of screen, the visual angle is 18.9 degrees. Assuming 525 scanning lines on the monitor screen, by dividing the number of scanning lines by the viewing angle, a sampling frequency 27.8 cpd (cycle per degree) along the direction of screen height is obtained as follows:

EQUATION #7

$$525/18.9 = 27.8$$

By obtaining a center frequency and 6 dB frequencies from the drawing in FIG. 3 and normalizing them by the sampling frequency (in this example, 27.8 cpd), the values included in the following equation may be adopted as a specification of the frequency characteristic of the noise filter 4.

EQUATION #8

$$\begin{array}{l}\text{Center Frequency} \rightarrow 4.0/27/8 = 0.14 \\ \text{Frequencies at 6dB} \left\{\begin{array}{l}\rightarrow 1.0/27/8 = 0.036 \\ \rightarrow 13.6/27.8 = 0.48\end{array}\right\} \\ \text{increased}\end{array}$$

Further, considering that the sensitivity of human eyes becomes lower as the spatial frequency becomes higher, the filter may be designed to gather noise at locations where the angular frequency $\omega 1$, $\omega 2$, corresponding to the transfer function P(Z1, Z2) at the higher frequency, becomes ($\omega 1$, $\omega 2 = \pi$). On the other hand, the filter may be designed to reduce the noise level at locations where the angular frequency $\omega 1$, $\omega 2$, corresponding to the lower frequency, becomes ($\omega 1$, $\omega 2 = 0$).

Figure 5:
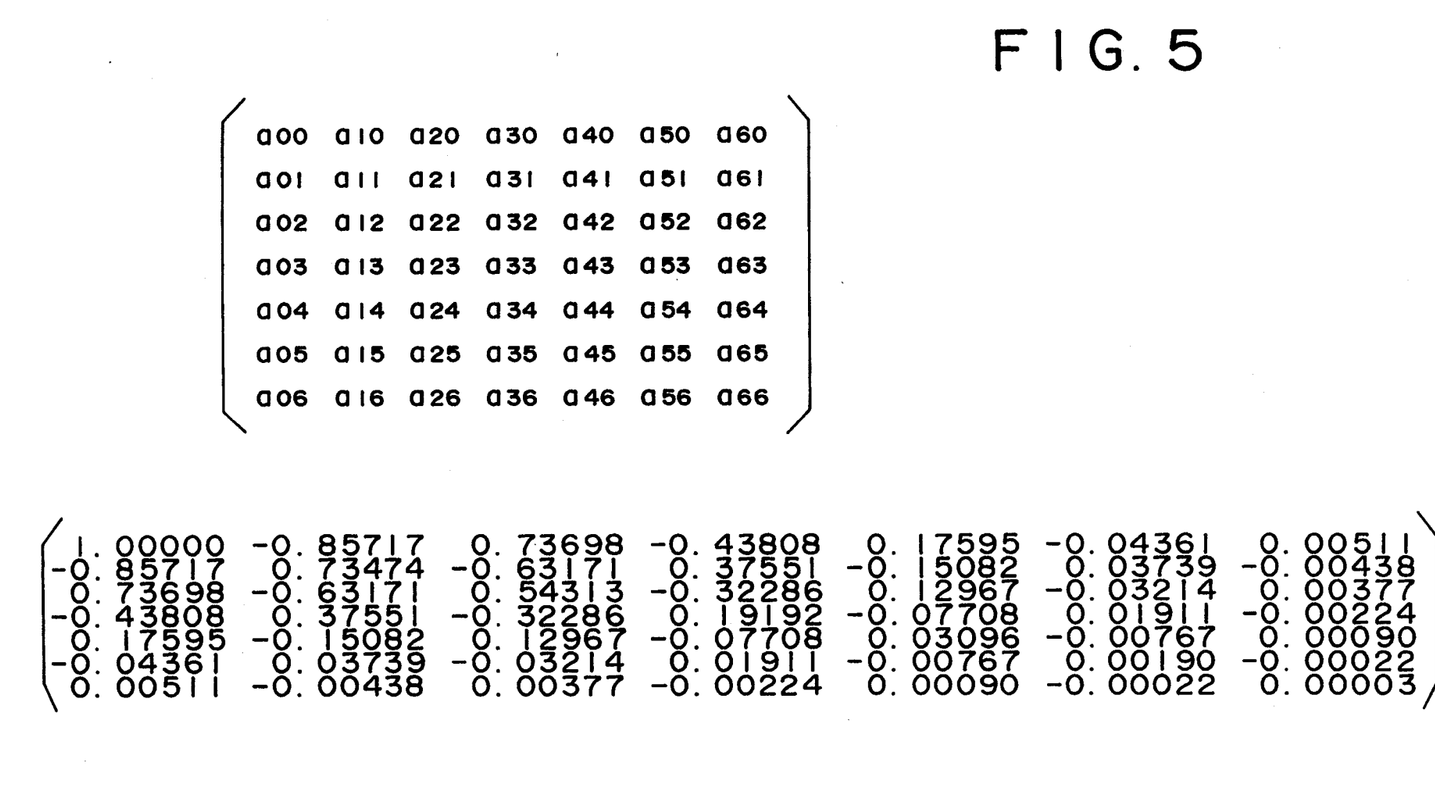
FIG. 5 is a chart of the calculated result for coefficients at taps in the transfer function unit shown in FIG. 1.

As the result, an example of coefficients can be obtained as described in FIG. 5 at taps in a FIR (Finite Impulse Response) type two-dimensional noise shaping filter circuit with seven by seven (7×7) gradation. In FIG. 5, the numeral "1.00000" at the left top corner corresponds to the "1" in the first clause of Equation #6.

Based on the table shown in FIG. 5, the coefficients a01-a06, - - - , a06,-a66 are determined at each of the coefficient units 1201-1206, - - - , 1260-1266 of the transfer function unit 4. When calculating the frequency characteristics of this two-dimensional noise shaping circuit, the amplitude, as described by the three dimensions in FIG. 6 and as represented by the contour lines in FIG. 7, can be obtained.

Figure 6:
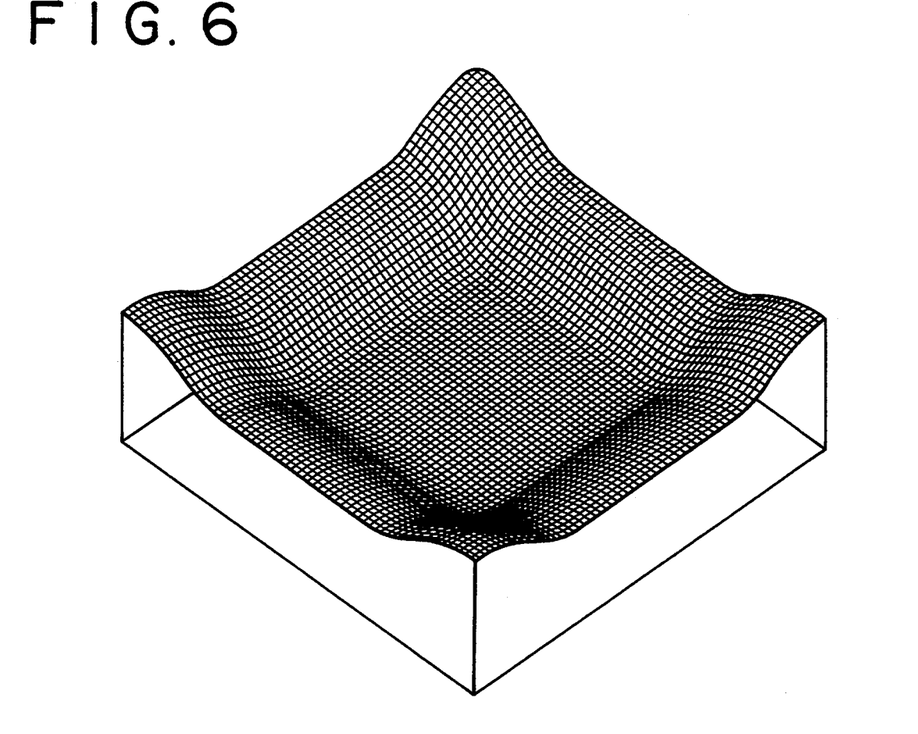
FIG. 6 is a three-dimensional drawing representing the magnitude of spatial frequencies with the use of tap coefficients from FIG. 5.
Figure 7:
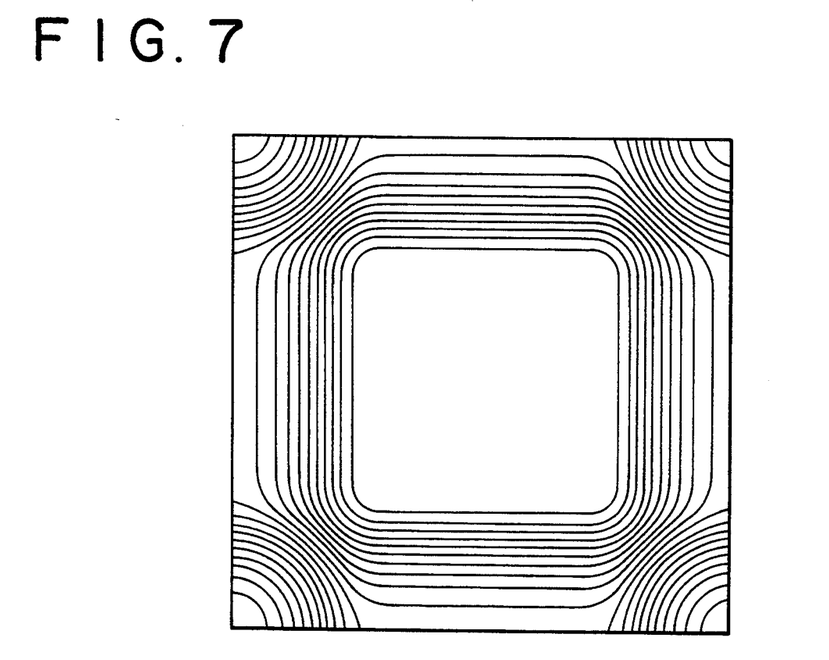
FIG. 7 is a drawing representing the magnitude of spatial frequencies by contour lines with the use of the tap coefficients from FIG. 5.

Using amplitude variations of FIGS. 6 and 7, the noise level can be made to be −9.48 dB, its lowest, at the location where ($\omega 1 = \omega 2 = 0$), and made to be 20.51 dB, its highest, at the location where ($\omega 1 = \omega 2 = \pi$). Thereby, the white noise caused by quantizing process can be brought to corners of the square Brillouin zone. Further, the noise level can be lowered at the center of screen with a lower spatial frequency.

When the above mentioned conditions are applied to a FIR type two-dimensional noise shaping filter circuit with three by three (3×3) gradation, the parameters along Z1 and Z2 directions respectively reduce to three. Using the above described conditions, and minimizing the noise level at the normalized frequency of 0.14 and at 6 dB higher than the minimum level, i.e., at the normalized frequency of 0.48, a table of coefficients, such as shown in FIG. 8, can be obtained for the coefficients at the taps in the vertical or horizontal direction.

Figure 8:
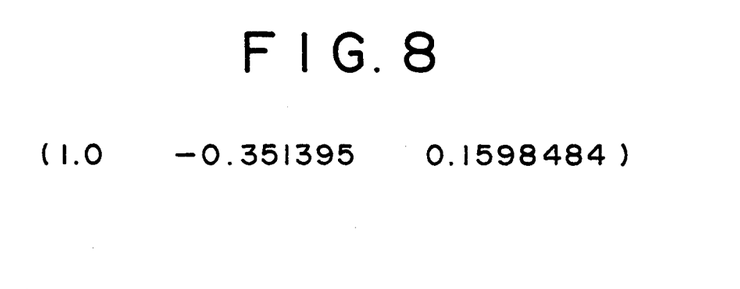
FIG. 8 depicts an example of one-dimensional coefficients for the taps in the transfer function unit shown in FIG. 1.
Figure 9:
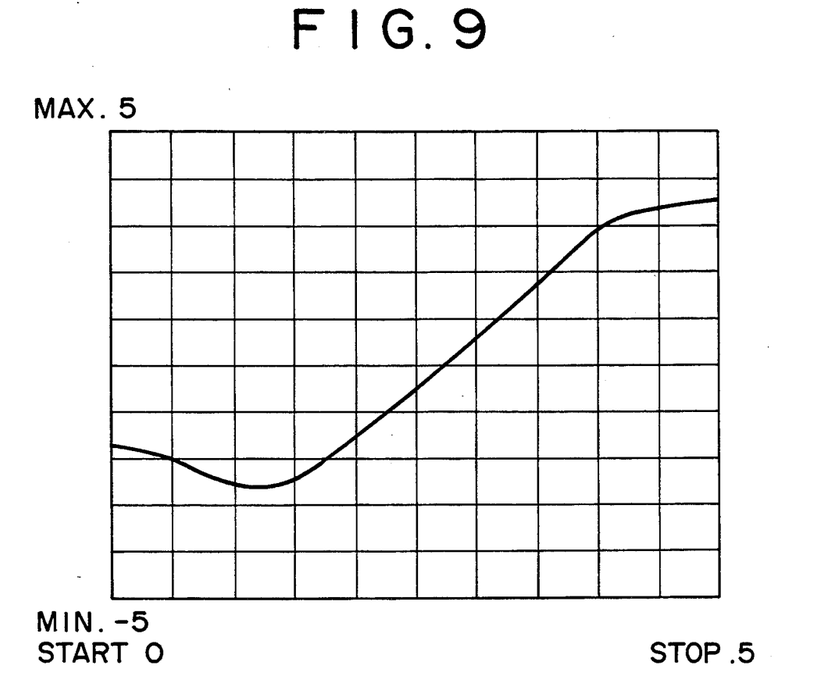
FIG. 9 is a drawing representing the magnitude of the spatial frequency using the tap coefficients of FIG. 8.

Then, by determining the tap coefficients along a vertical or horizontal direction based on the table in FIG. 8, the frequency characteristic shown in FIG. 9 can be obtained along the vertical or horizontal direction.

Figure 10:
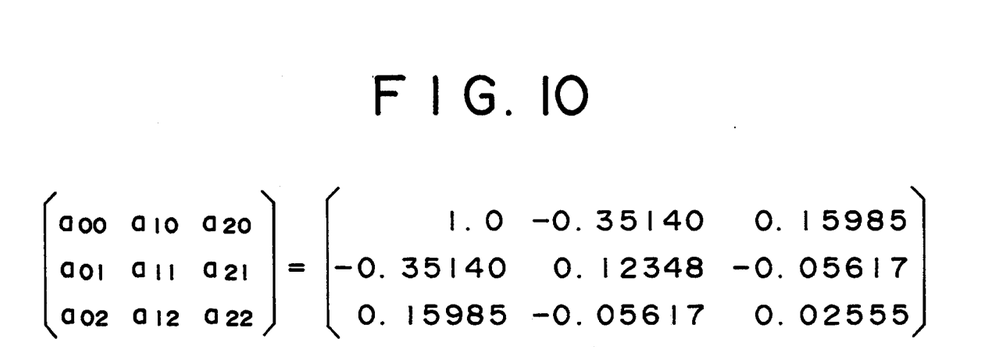
FIG. 10 is a chart containing an example of coefficients obtained by making the coefficients shown in FIG. 8 two-dimensional.

When the frequency characteristic in the vertical or horizontal direction is expanded to two-dimensions, a table of coefficients, such as shown in FIG. 10, can be obtained.

Figure 11:
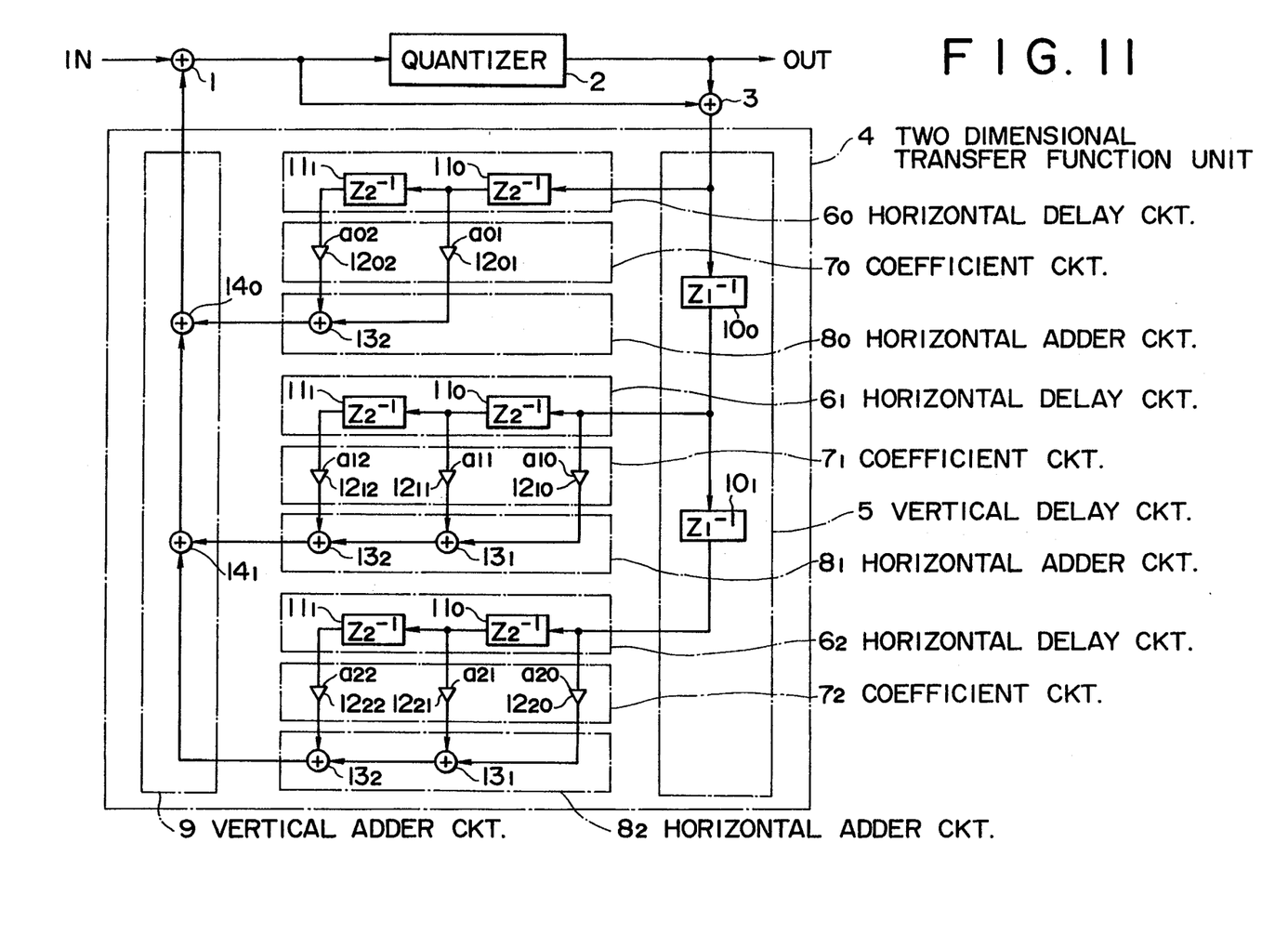
FIG. 11 is a block diagram including a detailed circuit arrangement of the two-dimensional noise shaping filter circuit having the tap coefficients of FIG. 10.

Based on the table shown in FIG. 10, the coefficients a01-a22 for each of the coefficient units 1201-1222 in the transfer function unit 4 shown in FIG. 11 may be determined. When calculating the frequency characteristics of this two-dimensional noise shaping circuit, the amplitude, as represented by the three dimensional depiction in FIG. 12 and by the contour lines in FIG. 13 can be obtained.

Figure 12:
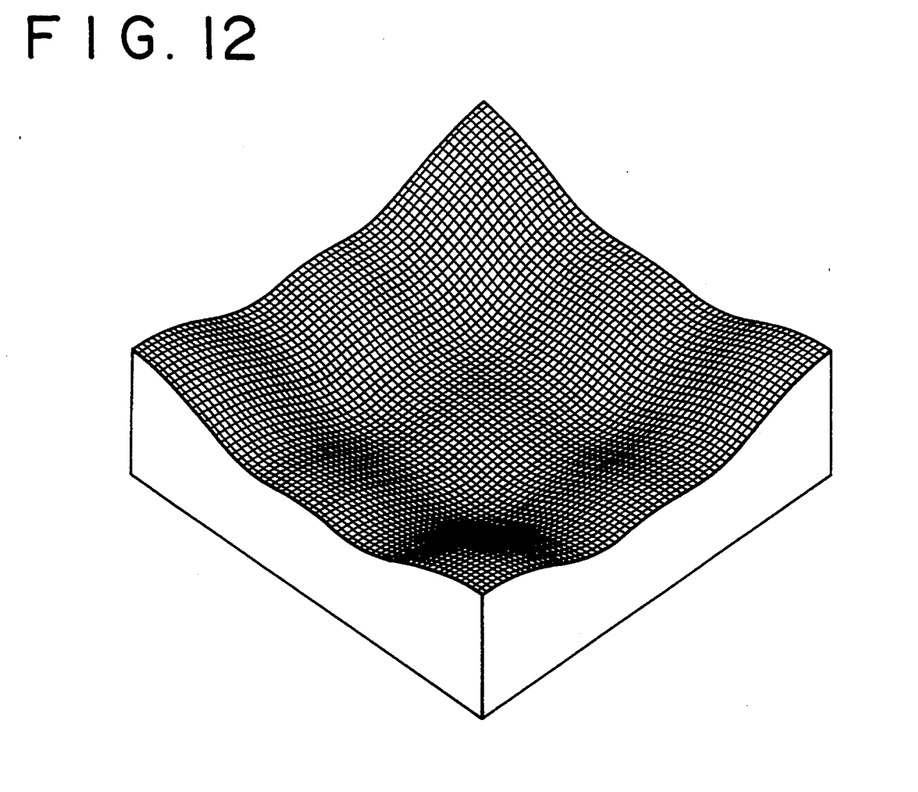
FIG. 12 is a three-dimensional drawing representing the relative magnitude of spatial frequencies using the two-dimensional noise shaping filter circuit of FIG. 11.
Figure 13:
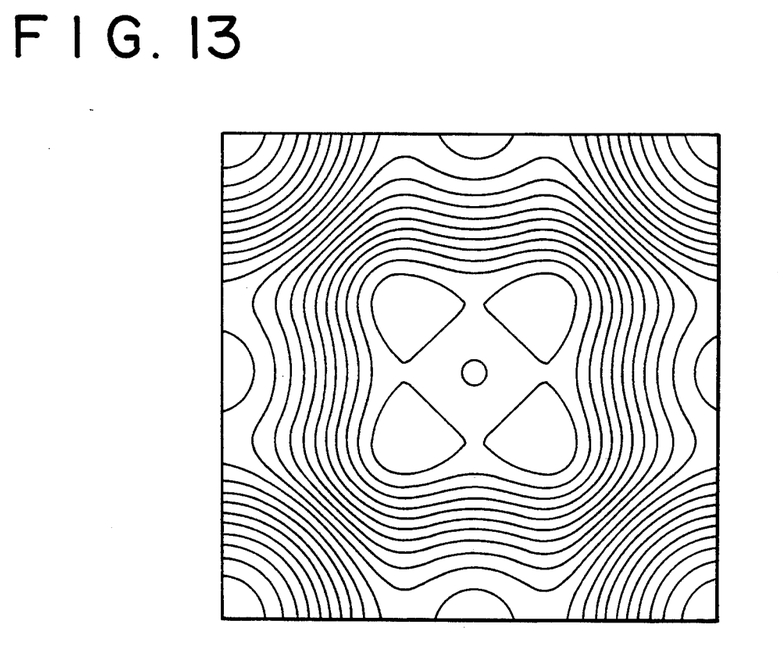
FIG. 13 is a drawing representing the magnitude of the spatial frequency by contour lines with the use of the two-dimensional noise shaping filter circuit of FIG. 11.

As seen in FIGS. 12 and 13, a two-dimensional noise shaping filter circuit can be obtained with the noise level being −4.9 dB at its lowest, and 7.2 dB at its highest.

Thereby, it is possible to provide a two-dimensional noise shaping process which includes the preceding and succeeding lines as in the above described two-dimensional noise shaping filter circuit. Any white noise caused by quantizing process can be brought to corners of the square Brillouin zone. Further, the noise level can be lowered at the center of screen with a lower spatial frequency.

Figure 14:
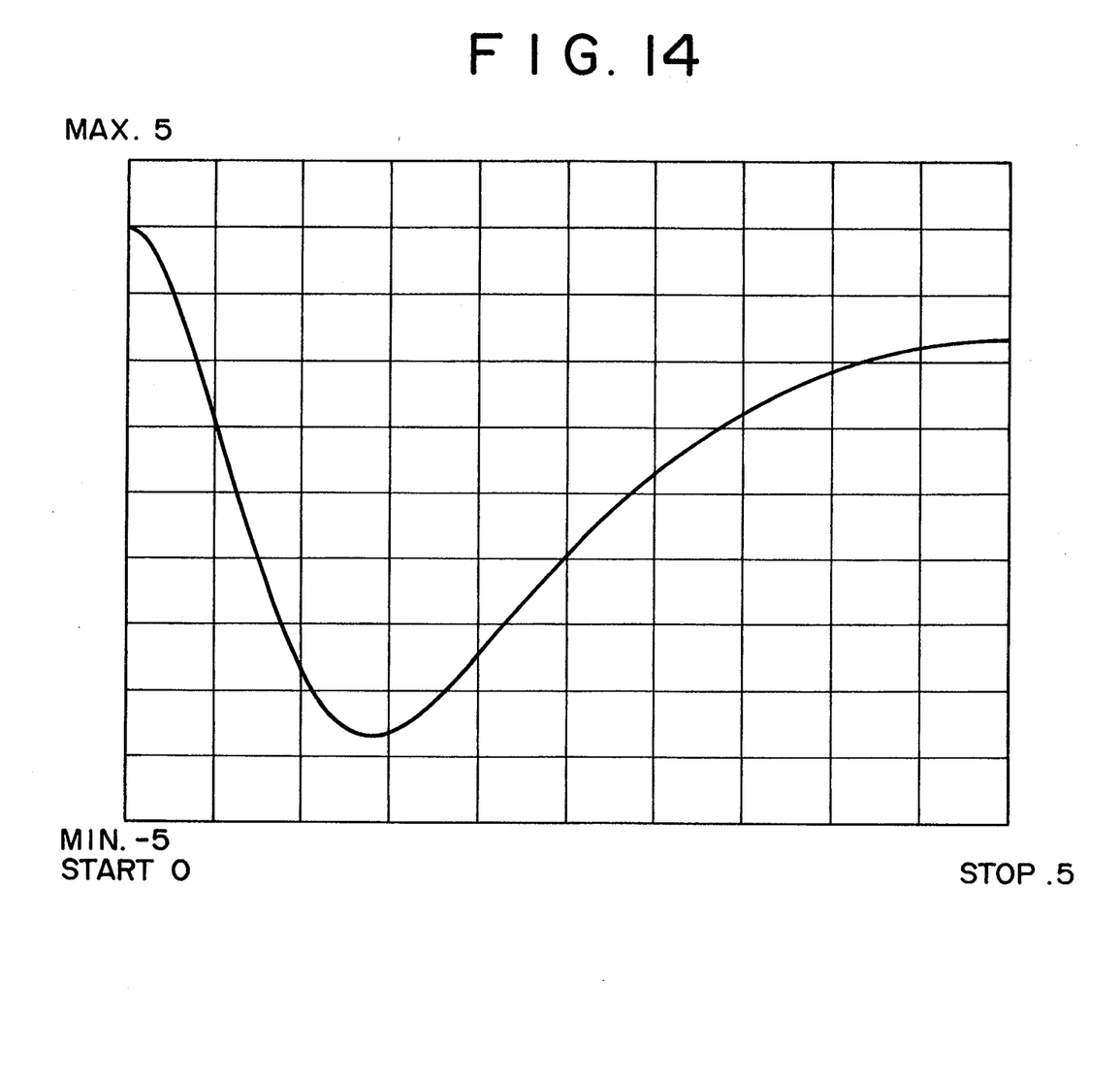
FIG. 14 is a drawing representing the magnitude of the spatial frequency using a one-dimensional transfer function as the basis for calculating the coefficients for use in the present invention.

The above mentioned theory can be applied to the IIR (Infinite Impulse Response) type filter circuit. By using a three over two gradation along the Z1 and Z2 directions, the numbers of parameters becomes four. As shown in FIG. 14, a frequency characteristic can be obtained along the vertical or horizontal direction by calculating the frequency characteristic for the IIR type filter circuit with the transfer function as represented by the following equation.

EQUATION #9

$$H(Z) = \frac{1 - 0.8774304Z^{-1} + 0.345532Z^{-2}}{1 - 0.7035577Z^{-1}}$$

$$= 1 - 0.17387z^{-1} \cdot \frac{1 - 1.28371Z^{-1}}{1 - 0.70365Z^{-1}}$$

A one-dimensional IIR type noise shaping filter circuit may then be expanded to a two-dimensional noise shaping filter circuit so as to have vertical and horizontal frequency characteristics equal to the frequency characteristic shown in FIG. 14. With the same conditions described above, by minimizing the noise level at the normalized frequency of 0.14 and at 6 dB higher than the normalized frequency, i.e., at 0.48 and 0.36, the following transfer function can be obtained.

EQUATION #10

$$H(Z_1 \cdot Z_2) = \left(1 - 0.17387Z_1^{-1} \cdot \frac{1 - 1.28371Z_1^{-1}}{1 - 0.70356Z_1^{-1}}\right)\left(1 - 0.17387Z_2^{-1} \cdot \frac{1 - 1.28371Z_2^{-1}}{1 - 0.70356Z_2^{-1}}\right)$$

Figure 15:
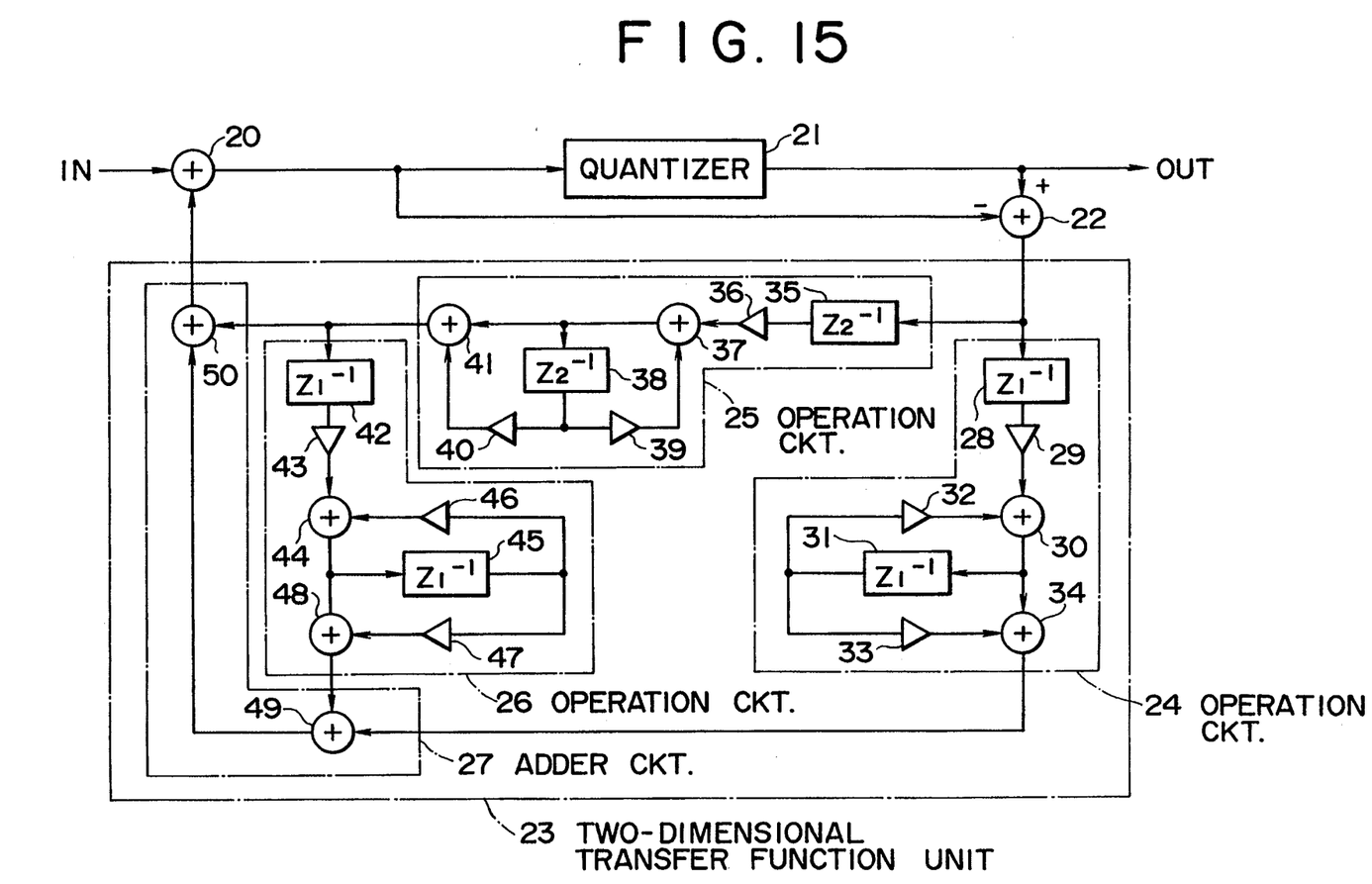
FIG. 15 illustrates in block diagram form another embodiment of a two-dimensional noise shaping filter circuit according to the present invention.

To realize this transfer function, a circuit, such as for example that shown in FIG. 15, may be utilized as an IIR type two-dimensional noise shaping filter circuit in the transfer function unit.

In FIG. 15, the IIR two-dimensional noise shaping filter circuit includes an adder 20, a quantizer 21, another adder 22 and a two-dimensional transfer function unit 23. The IIR filter circuit receives a signal to be processed and quantizes it. The quantizing distortion generated by this quantizing process is then fed back to input stage through the two-dimensional transfer function unit 23. Thus, while minimizing the quantizing distortion, the IIR filter circuit generates an output obtained by the quantizing process.

The adder 20 adds the signal to be processed with the signal fed back from the two-dimensional transfer function unit 23. The adder 20 then sends the added signal to both the quantizer 21 and another adder 22. The quantizer 21 receives the output of the adder 20 and quantizes it into a predetermined bit number. The output signal obtained by this quantizing process is supplied to the adder 22. The adder 22 performs a substraction process, subtracting the output signal of the adder 22 from the output of the quantizer 21 so as to generate an error signal representative of the quantizing error which occurred during the quantizing process at the quantizer 21. This quantizing error signal is supplied to the two-dimensional transfer function unit 23. The two-dimensional transfer function unit 23 includes three operation circuits 24, 25 and 26 and an adder circuit 27. The transfer function unit 23 provides the quantizing error signal from the adder 22 with a two-dimensional filtering process. The signal obtained by this filtering process is fed back to the adder 20 as a feedback signal.

The first stage operation circuit 24 includes one-pixel delay elements 28 and 31, coefficient elements 29, 32 and 33, and adders 30 and 34. The one-pixel delay element 28 delays the quantizing error signal from the adder 22 by a single pixel. The coefficient element 29 multiplies the quantizing error signal from the one-pixel delay element 28 by a predetermined coefficient. The adder 30 adds the quantizing error signal from the coefficient element 29 to a feedback signal. The one-pixel delay element 31 delays the quantizing error signal from the adder 30 by a single pixel. The coefficient element 32 multiplies the quantizing error signal from the one-pixel delay element 31 by a predetermined coefficient and the error signal thus obtained is fed to the adder 30 as a feedback signal. The coefficient element 33 multiplies the quantizing error signal from the one-pixel delay element 31 by a predetermined coefficient. The adder 34 adds the quantizing error signal from the coefficient element 33 to the quantizing error signal from the adder 30. In general, this operation circuit 24 receives the quantizing error signal from the adder 22 and performs a pixel-by-pixel filtering process. After this filtering process, the quantizing error signal is input to the adder circuit 27.

The second stage operation circuit 25 includes one-line delay elements 35 and 38, coefficient elements 36, 39 and 40, and adders 37 and 41. The one-line delay element 35 delays the quantizing error signal from the adder 22 by a single line. The coefficient element 36 multiplies the quantizing error signal from the one-line delay element 35 by a predetermined coefficient. The adder 37 adds the quantizing error signal from the coefficient element 36 to a feedback signal. The one-line delay element 38 delays the quantizing error signal from the adder 37 by a single line. The coefficient element 39 multiplies the quantizing error signal from the one-line delay element 38 by a predetermined coefficient and supplies the quantizing error signal thus obtained to the adder 37 as a feedback signal. The coefficient element 40 multiplies the quantizing error signal from the one-line delay element 38 by a predetermined coefficient. The adder 41 adds the quantizing error signal from the coefficient element 40 to the quantizing error signal from the adder 40. In general, the operation circuit 25 receives the quantizing error signal from the adder 22 and as a line-by-line filtering process. After this filtering process, the quantizing error signal is then input to the third operation circuit 26 and adder circuit 27.

The third stage operation circuit 26 includes one-pixel delay elements 42 and 45, coefficient elements 43, 46 and 47, and adders 44 and 48. The one-pixel delay element 42 delays the quantizing error signal from the second operation circuit 25 by a single pixel. The coefficient element 43 multiplies the quantizing error signal from out of the one-pixel delay element 42 by a predetermined coefficient. The adder 44 adds the quantizing error signal from the coefficient element 43 to a feedback signal. The one-pixel delay element 45 delays the quantizing error signal from the adder 44 by a single pixel. The coefficient element 46 multiplies the quantizing error signal from the one-pixel delay element 45 by a predetermined coefficient and supplies the quantizing error signal obtained by this operational process to the adder 44 as a feedback signal. The coefficient element 47 multiplies the quantizing error signal from of the one-pixel delay element 45 by a predetermined coefficient. The adder 48 adds the quantizing error signal from the coefficient element 47 to the quantizing error signal from the adder 44. In general, the operation circuit 26 receives the quantizing error signal from the second operation circuit 25 and performs a pixel-by-pixel filtering process. After this filtering process, the quantizing error signal is then supplied to the adder circuit 27.

The adder circuit 27 includes two adders 49 and 50 serially connected. They add each of the quantizing error signals from the operation circuits 24, 25 and 26 so as to generate a feedback signal to be supplied to the adder 20.

Figure 16:
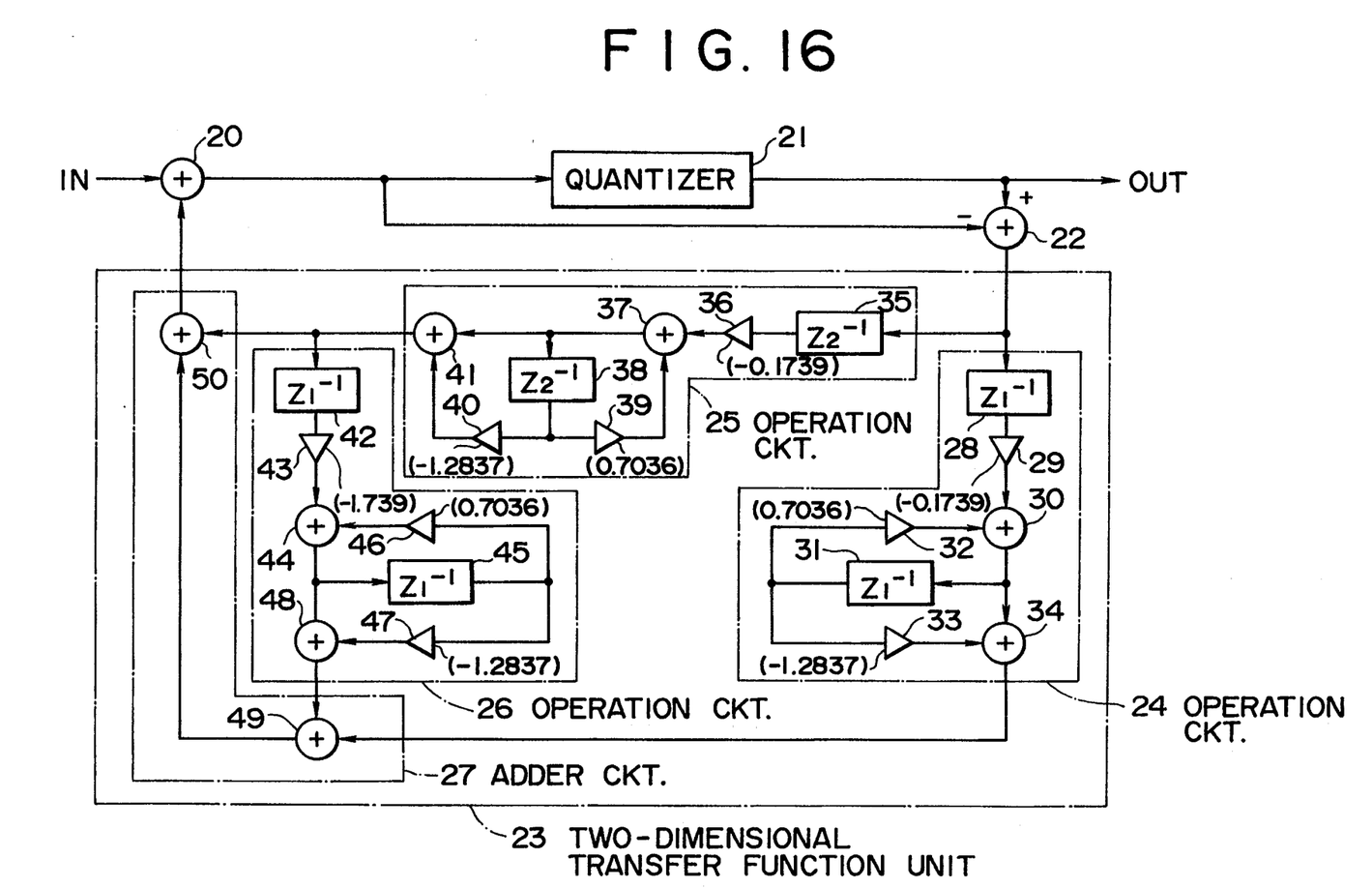
FIG. 16 is a block diagram of the two-dimensional noise shaping filter circuit of FIG. 15 with the tap coefficients obtained by making the transfer function of FIG. 14 two-dimensional.

Based on Equation #10, the values for the coefficients of coefficient elements 29, 32, 33, 36, 39, 40, 43, 46 and 47 are set as indicated in FIG. 16. When calculating the frequency characteristics of this two-dimensional dimensional noise shaping circuit, the amplitude, as represented by the three-dimensional depiction of FIG. 17 and as represented by the contour lines in FIG. 18, can be obtained.

Figure 17:
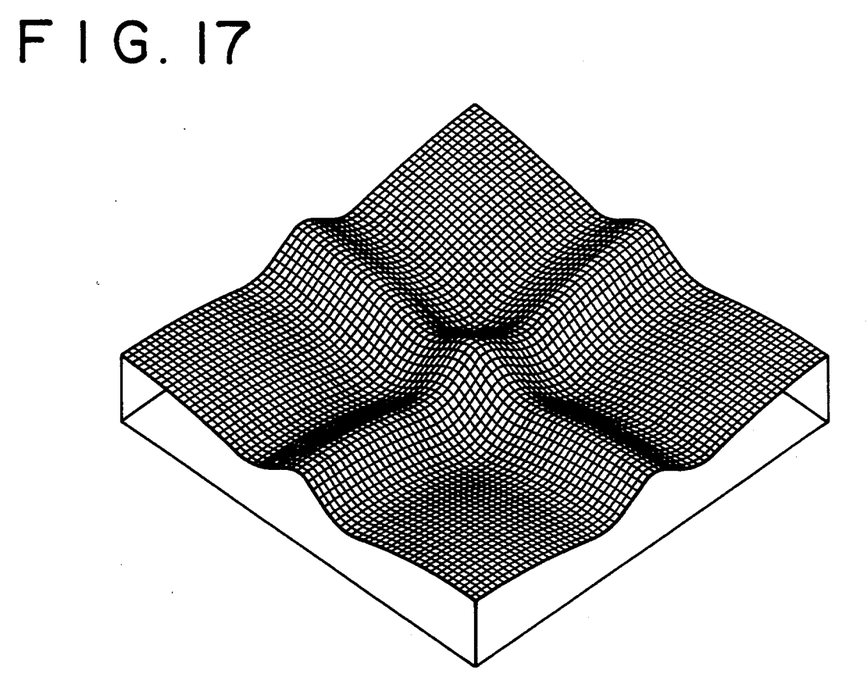
FIG. 17 is a three-dimensional drawing representing the magnitude of the spatial frequency using the two-dimensional noise shaping filter circuit of FIG. 16.
Figure 18:
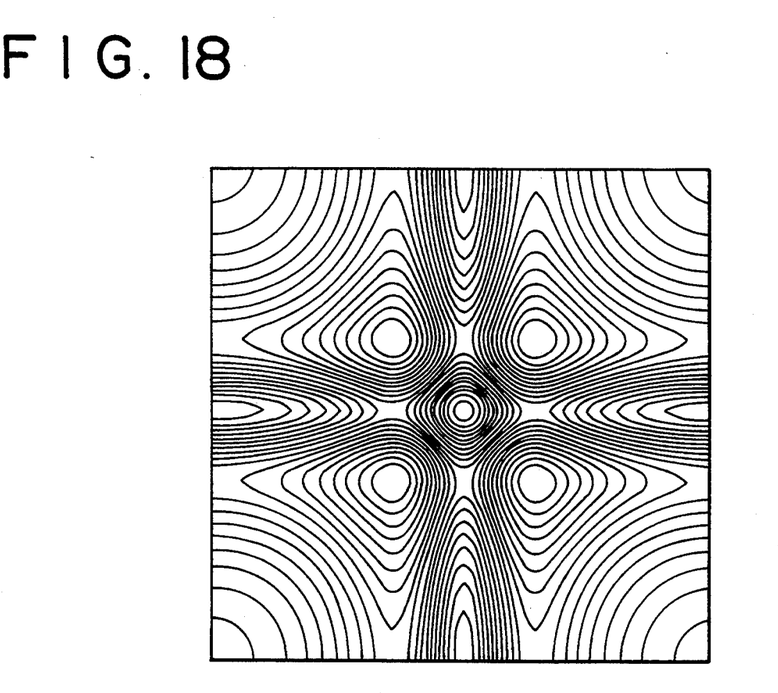
FIG. 18 is a drawing representing the magnitude of the spatial frequency by contour lines using the two-dimensional noise shaping filter circuit of FIG. 16.

As indicated by the amplitude representations of FIGS. 17 and 18, a two dimensional noise shaping filter circuit can be obtained with the frequency characteristic having noise level of $-7.4$ dB, at its lowest, and 20.51 dB at its highest.

While specific embodiments of the invention have been shown and disclosed, it is to be understood that numerous changes and modifications may be made by those skilled in the art without departing from the scope and intent of the invention.

What is claimed is:

1. A two-dimensional noise shaping filter circuit for two-dimensional noise shaping of an input video signal having a vertical component and a horizontal component to be processed comprising:
   a first adder for adding a feedback signal to said input video signal;
   a quantizer for quantizing an output from said first adder;
   a second adder for adding an output from said quantizer to the output from first adder;
   a transfer function unit having a two-dimensional transfer function for generating said feedback signal from the output of said second adder; said transfer function unit including a vertical delay circuit and a horizontal delay circuit connected to form a feedback loop between said second adder and said first adder, said vertical delay circuit being operable to process the vertical component of said video signal and the horizontal delay circuit being operable to process the horizontal component of said video signal.

2. The two-dimensional noise shaping filter circuit according to claim 1, wherein said vertical delay circuit includes a plurality of vertical delay elements for vertically delaying the video signal from said second adder in stages and a plurality of output taps for outputting a plurality of differentially delayed output signals from said plurality of vertical delay elements; and wherein said horizontal delay circuit includes a plurality of horizontal delay circuits each having a plurality of horizontal delay elements for horizontally delaying said plurality of output signals from said vertical delay circuit output taps and further comprising a plurality of output taps for outputting a plurality of differentially delayed output signals from said plurality of horizontal delay elements, said transfer function unit further comprising:
   a plurality of coefficient circuits associated with the taps of said horizontal delay circuit so that output from said taps of each horizontal delay element can be weighted by a respectively predetermined coefficient;
   a plurality of horizontal adder circuits respectively associated with said plurality of coefficient circuits so as to add said weighted outputs together; and
   a vertical adder circuit for adding the outputs of said plurality of horizontal adder circuits to generate said feedback signal.

3. A two-dimensional noise shaping filter circuit for two-dimensional noise shaping of an input video signal having a vertical component and a horizontal component, said circuit comprising:
   a first adder for adding a feedback signal to said input video signal;
   a quantizer for quantizing an output from said first adder;
   a second adder for adding an output from said quantizer to the output of said first adder;
   a transfer function unit having a two-dimensional transfer function for generating said feedback signal from the output of said second adder, said transfer function unit further comprising:

an operational portion (24, 25, 26) including a horizontal component operation circuit and a vertical component operation circuit, each of said operation circuits generating an output signal;

an adder circuit (27) for adding the output signals from said operational portion to generate said feedback signal.

4. The two-dimensional noise shaping filter circuit according to claim 3, wherein said horizontal operation circuit further comprises:

a first horizontal delay element for delaying said input signal;

a first coefficient element for providing an output of said first horizontal delay element with a certain weight;

a third adder for adding an output of said first coefficient element to a first feedback signal;

a second horizontal delay element for delaying an output of said third adder;

a second coefficient element for providing an output of said second horizontal delay element with a certain weight so as to generate said first feedback signal and supply it to said third adder;

a third coefficient element for providing an output of said second horizontal delay element with a certain weight; and a fourth adder for adding output of said third coefficient element to the output of said third adder.

5. The two-dimensional noise shaping filter circuit according to claim 3, wherein said vertical operation circuit includes:

a first vertical delay element for delaying said input signal;

a fourth coefficient element for providing an output of said first vertical delay element with a certain weight;

a fifth adder for adding an output of said fourth coefficient element to a second feedback signal;

a second vertical delay element for delaying an output of said fifth adder;

a fifth coefficient element for providing an output of said second vertical delay element with a certain weight so as to generate said second feedback signal and supply it to said fifth adder;

a sixth coefficient element for providing an output of said second vertical delay element with a certain weight; and a sixth adder for adding the output of said sixth coefficient element to the output of said fifth adder.

6. The two-dimensional noise shaping filter circuit according to claim 3, wherein said horizontal operation circuit further comprises means for performing a line-by-line filtering process on the output signal from said second adder and generating an output signal; and wherein said vertical operation circuit further comprises means for performing a pixel-by-pixel filtering process on the output from said second adder and generating an output signal; and means for performing a pixel-by-pixel filtering process on the output signal from said horizontal operation circuit and generating an output signal.

* * * * *